United States Patent
Buia et al.

(10) Patent No.: US 9,440,547 B2
(45) Date of Patent: Sep. 13, 2016

(54) METHOD FOR CHARGING A PLUG-IN ELECTRIC VEHICLE

(71) Applicant: GM GLOBAL TECHNOLOGY OPERATIONS LLC, Detroit, MI (US)

(72) Inventors: Christian J. Buia, Troy, MI (US); Mohammad A. Fayyad, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 14/269,756

(22) Filed: May 5, 2014

(65) Prior Publication Data

US 2015/0314690 A1   Nov. 5, 2015

(51) Int. Cl.

| | |
|---|---|
| H01M 10/44 | (2006.01) |
| H01M 10/46 | (2006.01) |
| B60L 11/18 | (2006.01) |
| H02J 7/00 | (2006.01) |
| B60L 3/00 | (2006.01) |
| B60L 3/04 | (2006.01) |
| B60L 3/12 | (2006.01) |
| B60L 7/14 | (2006.01) |
| B60L 11/12 | (2006.01) |

(52) U.S. Cl.
CPC ............ *B60L 11/184* (2013.01); *B60L 3/0046* (2013.01); *B60L 3/0069* (2013.01); *B60L 3/04* (2013.01); *B60L 3/12* (2013.01); *B60L 7/14* (2013.01); *B60L 11/126* (2013.01); *B60L 11/1816* (2013.01); *B60L 11/1844* (2013.01); *B60L 11/1846* (2013.01); *B60L 11/1848* (2013.01); *B60L 11/1857* (2013.01); *B60L 11/1861* (2013.01); *B60L 11/1866* (2013.01); *B60L 11/1874* (2013.01); *B60L 11/1877* (2013.01); *B60L 11/1879* (2013.01); *H02J 7/0052* (2013.01); *B60L 2210/14* (2013.01); *B60L 2210/30* (2013.01); *B60L 2210/40* (2013.01); *B60L 2220/14* (2013.01); *B60L 2220/16* (2013.01); *B60L 2240/545* (2013.01); *B60L 2240/547* (2013.01); *B60L 2240/549* (2013.01); *B60L 2240/80* (2013.01); *B60L 2250/16* (2013.01); *B60L 2260/56* (2013.01)

(58) Field of Classification Search
CPC .... H02J 7/0011; H02J 7/0004; H02J 7/0021; H02J 7/0026; G01R 31/3648; G01R 31/3655; G07B 15/063; G06Q 30/0255
USPC ............... 320/104, 107, 109, 132, 149, 155; 702/63, 64, 65; 705/13, 14.53
See application file for complete search history.

(56) References Cited

U.S. PATENT DOCUMENTS

| | | | | |
|---|---|---|---|---|
| 2011/0202221 A1* | 8/2011 | Sobue | .................... | B60K 16/00 701/22 |
| 2012/0245750 A1* | 9/2012 | Paul | ...................... | G06Q 50/06 700/291 |
| 2013/0057211 A1* | 3/2013 | Kuribayashi | ....... | B60L 11/1844 320/109 |
| 2015/0032516 A1* | 1/2015 | Deshpande | ............ | G06Q 50/06 705/13 |

* cited by examiner

*Primary Examiner* — Edward Tso
(74) *Attorney, Agent, or Firm* — Reising Ethington, P.C.; Lionel D. Anderson (57) ABSTRACT

A system and method for charging a battery in a plug-in electric vehicle. In an exemplary embodiment, the present method uses a charging profile and a scheduled departure time to develop a charging scheme for a plug-in electric vehicle that balances battery life with electricity costs. The charging scheme attempts to reduce the amount of time at which the battery is maintained at elevated state-of-charge (SOC) levels before a scheduled departure time, while still satisfying the electricity rate preferences established by the user. Reduced time spent at elevated SOC levels can, over the long term, improve battery life by increasing the capacity and performance of the battery.

16 Claims, 5 Drawing Sheets

METHOD FOR CHARGING A PLUG-IN ELECTRIC VEHICLE

FIELD

The present invention generally relates to plug-in electric vehicles, and more particularly, to methods for charging plug-in electric vehicles.

BACKGROUND

It is known for charging systems in plug-in electric vehicles to include some custom charging features. For example, some charging systems allow a user to provide electricity rate preferences so that the vehicle can be charged during off-peak times when demand for electricity is lower and so is the associated cost. The cost of electricity, however, is not the only concern or factor that should be taken into account when devising a charging scheme for a plug-in electric vehicle.

Another factor that should be considered relates to the life or health of the battery. Generally speaking, the longer a high voltage battery, like those based on lithium-ion chemistries, is at an elevated state-of-charge (SOC), the more potential there is for battery life degradation. The dual objectives of reducing electricity costs and preserving battery life are not always synchronous with one another. For example, it may be less expensive to charge the vehicle as soon as the user plugs it in to an external power source, but this could result in a high SOC level for many hours before the vehicle is driven and could have a diminishing effect on battery life. Conversely, if the vehicle battery is only charged during the period immediately preceding a scheduled departure time in an effort to reduce the duration at which the vehicle battery is at a high SOC, with no regard to electricity cost, then this could result in unacceptably high electricity costs.

Therefore, it would be beneficial to find a balanced approach to charging plug-in electric vehicles that considers both electricity costs and battery life, among other factors.

SUMMARY

According to one embodiment, there is provided a method of charging a battery in a plug-in electric vehicle. The method may comprise the steps of: obtaining electricity rate preferences; obtaining a scheduled departure time; determining an amount of charge needed to fully charge the battery; and developing a charging scheme for charging the battery with a control module, wherein the charging scheme satisfies the electricity rate preferences and shifts charging towards the scheduled departure time.

According to another embodiment, there is provided a method of charging a battery in a plug-in electric vehicle. The method may comprise the steps of: obtaining an electricity rate schedule; obtaining electricity rate preferences; obtaining a scheduled departure time; identifying a plurality of time segments between a current time and the scheduled departure time that satisfy the electricity rate preferences according to the electricity rate schedule; and developing a charging scheme for charging the battery with a control module, wherein the charging scheme includes one or more time segments from the plurality of time segments and is designed to complete the charging process as close to the scheduled departure time as possible so as to minimize the amount of time between completion of the charging process and the scheduled departure time.

DRAWINGS

Preferred exemplary embodiments will hereinafter be described in conjunction with the appended drawings, wherein like designations denote like elements, and wherein.

DESCRIPTION

The method described herein may be used to charge any type of plug-in electric vehicle having a battery, such as a plug-in hybrid electric vehicle (PHEV), an extended-range electric vehicle (EREV), or a battery electrical vehicle (BEV), to cite a few possibilities. In general terms, the present method uses a charging profile and a scheduled departure time to develop a charging scheme for a plug-in electric vehicle that balances battery life with electricity costs. The charging scheme attempts to reduce the amount of time at which the vehicle battery is maintained at an elevated state-of-charge (SOC), while still satisfying the electricity rate preferences established by the user. The improved battery life will increase the capacity and performance of the vehicle battery and, in the long run, may help reduce warranty costs.

Figure 1:
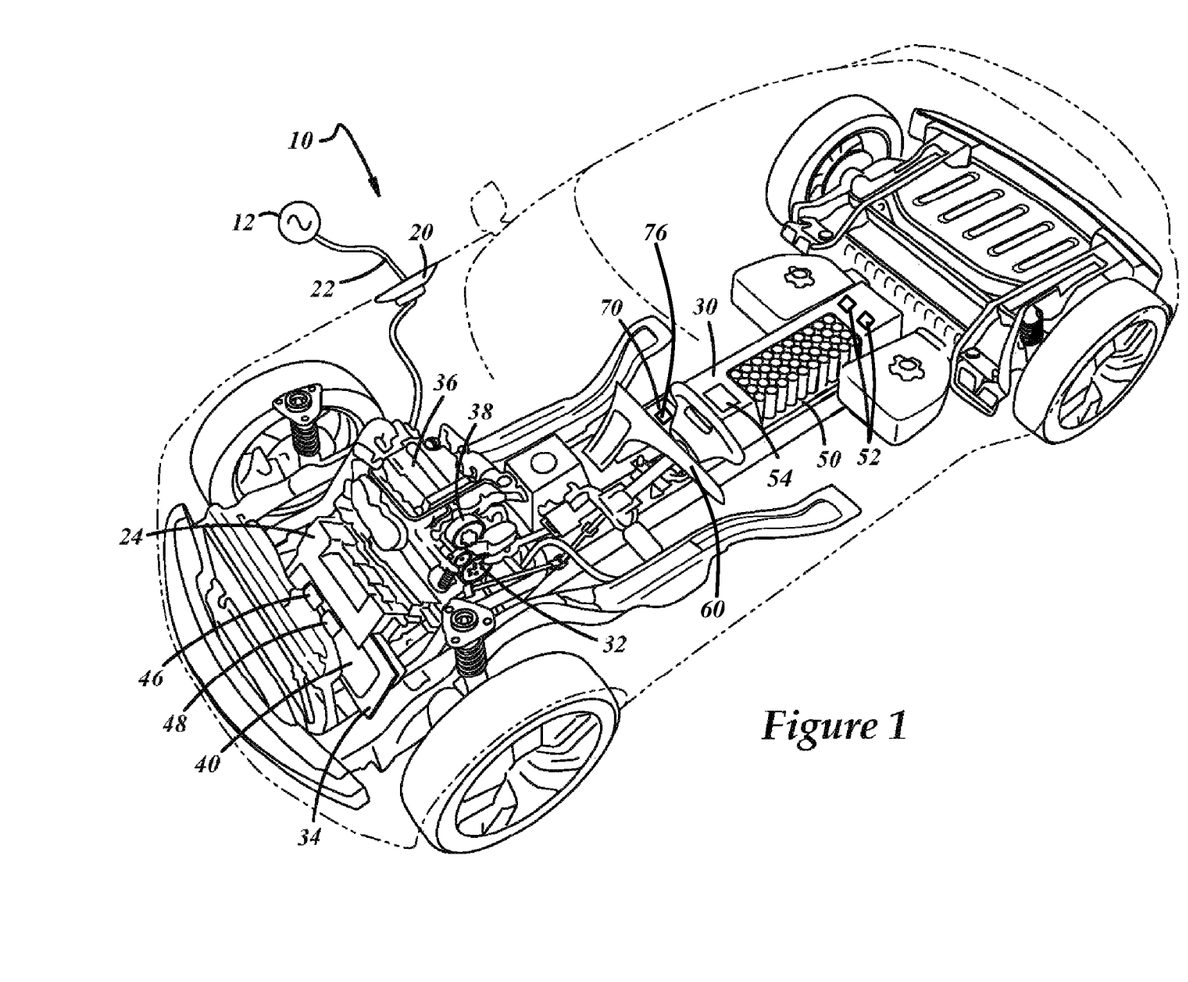
FIG. 1 is a schematic view of an exemplary embodiment of a plug-in electric vehicle that may utilize the charging method and system disclosed herein.

With reference to FIG. 1, there are shown some of the components of an exemplary plug-in electric vehicle 10 with which the method and system described herein may be used. Although the following description is provided in the context of the particular plug-in electric vehicle 10 illustrated in FIG. 1, it will be appreciated that this vehicle is merely exemplary and that other plug-in electric vehicles may certainly be used instead. According to an exemplary embodiment, plug-in electric vehicle 10 interacts with an external power source 12 and may include, among other components, a power connection 20, a power coupler 22, a battery charger 24, a battery 30, an electric motor 32, an inverter/converter 34, a control module 40, a user interface 60, and a communications module 70.

External power source 12 provides plug-in electric vehicle 10 with electrical power over power coupler 22, and may be one of a number of different power supply types known in the art. For example, external power source 12 can be connected to a public utility to provide electrical power via standard power outlets (e.g., 110 VAC or 220 VAC outlets), or it can be a portable generator such as the type that runs on natural gas, propane, gasoline, diesel, or the like. In one embodiment, external power source 12 is a renewable power source, such as a remote charging station or kiosk powered by energy from solar panels, wind turbines, hydroelectric means, biomass, etc. External power source 12 is not limited to any particular type or embodiment, so long as it can provide electrical power to plug-in electric vehicle 10 over power coupler 22.

Power connection 20 is an electrical inlet on the plug-in electric vehicle into which power coupler 22 can be plugged or inserted. This enables a vehicle owner or user to easily connect and disconnect plug-in electric vehicle 10 to and from a common AC wall outlet, for example, such as those commonly found in most garages and charging stations. Power connection 20 is not limited to any particular design, and may be any type of inlet, connection, socket, plug, port, receptacle, etc., including those that are based on conductive, inductive, or other types of electrical connections. In an exemplary embodiment, power connection 20 is an electrical inlet located on the exterior of plug-in electric vehicle 10 so that it can be easily accessed (e.g., under a hinged door or panel), and includes one or more connections to battery charger 24 for conveying electrical power, and one or more connections to control module 40 for communication. Other arrangements and connections are certainly possible.

Power coupler 22 can be used to connect external power source 12 to plug-in electric vehicle 10. Power couplers are sometimes referred to as electric vehicle supply equipment (EVSE) cordsets. Power coupler 22, in one embodiment, may be a specialized cordset specifically designed for use with plug-in electric vehicles (such as those described in specifications SAE J1772 and J1773), which includes a first end, a cable or cord, a control module, and a second end. The first end of power coupler 22 is a three-prong connection that plugs into a standard AC wall outlet and its second end is a specifically designed connection that plugs into power connection 20 on the vehicle. The cable conducts or transmits electrical power from external power source 12 to plug-in electric vehicle 10, but may also convey one or more communication signals between a control module of power coupler 22 and devices located on the vehicle, like control module 40. The control module of power coupler 22 may include any number of electronic components including, but certainly not limited to, sensors, transceivers, processing devices, memory devices, contactors, switches, ground fault circuit interrupter (GFCI) components, as well as any other suitable component. In an exemplary embodiment, the control module of power coupler 22 monitors various conditions surrounding the power coupler (e.g., the presence of electrical power, the voltage and/or current of the electrical power, the temperature of the power coupler, etc.), and communicates with control module 40 regarding such conditions. Skilled artisans will appreciate that the method described herein is not limited to any particular power coupler or cordset, as any number of different power couplers could be used.

Battery charger 24 may receive electrical power from a variety of sources, including external and/or internal power sources. In the case of an external power source, battery charger 24 may receive electrical power through power coupler 22 which connects external power source 12 to battery charger 24, as already explained. In the case of an internal power source, battery charger 24 may receive electrical power from regenerative braking, a motor-driven generator, or some other internal power source via connections within the vehicle. In certain embodiments, battery charger 24 may be configured to perform one or more steps of the charging method described below. Skilled artisans will appreciate that battery charger 24 may be provided according to any number of different embodiments, may be connected in any number of different configurations, and may include any number of different components, such as transformers, rectifiers, switching power supplies, filtering means, cooling means, sensors, control modules and/or any other suitable components known in the art.

Battery 30 provides the plug-in electric vehicle with electrical power and, depending on the particular embodiment, may be the primary electrical power source for the vehicle or may be used in conjunction with another power source for power supplementation purposes, to cite two examples. Many different battery types and arrangements may be used, including the exemplary one schematically shown here which includes a battery pack 50, one or more battery sensors 52, and a battery control module 54. Battery pack 50 is a high-voltage battery pack and may include a collection of identical or individual battery cells connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), or some other battery technology. The battery pack 50 may provide approximately 40-600V, depending on its particular design and application. For example, a heavy truck using a two-mode hybrid system may require a high voltage battery pack capable of providing about 350V, where a lighter vehicle may only need about 200V. In any case, battery pack 50 should be designed to withstand repeated charge and discharge cycles and to receive electrical energy from external power source 12. Skilled artisans will appreciate that the system and method shown and described herein are not limited to any one particular type of battery or battery arrangement, as a number of different battery types could be employed.

Battery sensors 52 may include any combination of hardware and/or software components capable of monitoring battery conditions or parameters (e.g., electrical parameters of the battery pack 50) such as, for example, battery temperature, battery voltage, battery current, battery state-of-charge (SOC), battery state-of-health (SOH), and other conditions or parameters that may relate to the charge level or capacity of the battery. These sensors may be integrated within module 30 (e.g., an intelligent or smart battery), they may be external sensors located outside of the battery module, or they may be provided according to some other known arrangement. Battery sensors 52 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 52 may be provided to battery control module 54, battery charger 24, control module 40, or some other appropriate device. Accordingly, battery sensors 52 may be electrically connected (e.g., by one or more wires or cables, wirelessly, etc.) to one or more of the aforementioned components.

Battery control module 54 may include any variety of electronic processing devices, memory devices, input/output (I/O) devices, and other known components, and may perform various control and/or communication related functions. For example, battery control module 54 may receive sensor signals from the various battery sensors 52, package the sensor signals into an appropriate sensor message, and send the sensor message to control module 40 over a communication bus or the like. It is possible for battery control module 54 to gather battery sensor readings and store them in local memory so that a comprehensive sensor message can be provided to control module 40 at a later time, or the sensor readings can be forwarded to module 40 or some other destination as soon as they arrive at battery control module 54, to cite a few possibilities. Instead of sending the battery sensor readings to control module 40 for subsequent processing, it is possible for battery control module 54 to process or analyze the sensor readings itself. In another capacity, battery control module 54 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc. Additionally, in certain embodiments, battery control module 54 may be configured to perform one or more steps of the charging method described below.

Electric motor 32 may use electrical energy stored in battery 30 to drive one or more vehicle wheels, which in turn propels the vehicle. While FIG. 1 schematically depicts electric motor 32 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Plug-in electric vehicle 10 is not limited to any one particular type of electric motor, as many different motor types, sizes, technologies, etc. may be used. In one example, electric motor 32 includes an AC motor (e.g., a three-phase AC induction motor, a multi-phase AC induction motor, etc.), as well as a generator that can be used during regenerative braking. Electric motor 32 may be provided according to any number of different embodiments (e.g., AC or DC motors, brushed or brushless motors, permanent magnet motors, etc.), it may be connected in any number of different configurations, and it may include any number of different components, like cooling features, sensors, control modules and/or any other suitable components known in the art.

Inverter/converter 34 may act as an intermediary between battery 30 and electric motor 32, as these two devices are often times designed to function according to different operational parameters. For example, during vehicle propulsion inverter/converter 34 may step-up the voltage from battery 30 and convert the current from DC to AC in order to drive electric motor 32, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device; however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control modules and/or any other suitable components known in the art.

In certain embodiments, the plug-in electric vehicle 10 may further comprise an engine 36 and a generator 38. Engine 36 may drive generator 38 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 36 is a small fuel-efficient engine (e.g., a small displacement, turbo-charged four-cylinder engine) that uses its mechanical output to turn generator 38. Skilled artisans will appreciate that engine 36 may be provided according to any number of different embodiments, may be connected in any number of different configurations (e.g., engine 36 could be part of a parallel hybrid system where the engine is also mechanically coupled to the vehicle wheels instead of exclusively being used to generate electricity), and may include any number of different components, like sensors, control modules and/or any other suitable components known in the art.

Generator 38 is mechanically coupled to engine 36 so that the mechanical output of the engine causes the generator to create electrical power that may be provided to battery 30, electric motor 32, or both. It is worth noting that generator 38 may be provided according to any number of different embodiments (e.g., the generator of motor 32 and generator 38 may be combined into a single unit), may be connected in any number of different configurations, and may include any number of different components, like sensors, control modules and/or any other suitable components known in the art. Generator 38 is not limited to any specific generator type or embodiment.

Control module 40 may be used to control, govern or otherwise manage certain operations or functions of plug-in electric vehicle 10, such as, for example, the charging of the battery 30. According to one exemplary embodiment, the control module 40 includes a processing device 46 and a memory device 48. Processing device 46 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 48 may include any type of suitable electronic memory means and may store a variety of data and information. This includes, for example: sensed battery conditions; look-up tables and other data structures; software, firmware, programs, algorithms, scripts, and other electronic instructions; component characteristics and background information; various battery parameter thresholds; etc. The present method—as well as any other electronic instructions and/or information needed for such tasks—may also be stored or otherwise maintained in memory device 48. Control module 40 may be electronically connected to other vehicle devices and modules via I/O devices and suitable connections, like a communications bus, so that they can interact as required. These are, of course, only some of the possible arrangements, functions and capabilities of control module 40, as others are certainly possible.

Depending on the particular embodiment, control module 40 may be a stand-alone electronic module (e.g., a battery control module, a vehicle integration control module (VICM), a traction power inverter module (TPIM), a battery power inverter module (BPIM), etc.), it may be incorporated or included within another electronic module in the vehicle (e.g., a power train control module, an engine control module, a hybrid control module, etc.), or it may be part of a larger network or system (e.g., a battery management system (BMS), a vehicle energy management system, etc.), to name a few possibilities.

While the description above provides that the control module 40 is configured to perform one or more steps of the methodology described below, the present disclosure is not meant to be so limited. Rather, in other exemplary embodiments that remain within the spirit and scope of the present disclosure, various components of the plug-in electric vehicle 10 (e.g., battery charger 24, battery control module 54, etc.), in addition to or instead of control module 40, may be configured to perform one or more steps of the methodology. A charging system that is either part of or is used with a plug-in electric vehicle and a control module thereof may be configured to perform one or more steps of the methodology. In the case of plug-in electric vehicle 10, a charging system may include one or more components of the vehicle like battery charger 24, control module 40, and battery control module 54, and as such, may be configured to perform one or more steps of the methodology. Therefore, the present methodology is not limited to performance by any one or more component. The terms "control module" and "control unit" are used interchangeably and may refer to the same component.

User interface 60 may include any combination of hardware, software and/or other components that enable a vehicle user to exchange information or data with the vehicle. This includes, for example, input components like a touch-screen display, a microphone, a keyboard, a keypad, one or more pushbuttons, a graphical user interface (GUI), or other suitable control where user interface 60 receives information from a vehicle user, as well as output components like a visual display, an instrument panel, or an audio system where user interface 60 provides information to the vehicle user. In some cases, user interface 60 includes components with both input and output capabilities, such as visual and audible interfaces. The audible interface may be part of an automated voice processing system that uses voice-recognition and/or other human-machine interface (HMI) technology. User interface 60 may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); it may be integrated within an existing audio system; or it may simply include an electronic connection or port (wired or wireless) for connecting with a laptop or other computing or data entry device, to cite a few examples.

As explained below in more detail, user interface 60 may be used by the present method to exchange information between a vehicle user and the plug-in electric vehicle in a way that facilitates control of the charging process. For instance, user interface 60 may receive one or more customized charging settings, thresholds or criteria like electricity rate preferences, vehicle conditions, charging times (e.g., desired charging start and/or completion times), scheduled departure times, and/or other input from a vehicle user; input that may be used by the present method to control charging of the battery. In addition, user interface 60 may be used by the present method to provide charging status, reports and/or other output to a vehicle user. Other user interfaces may be used instead, as the exemplary user interfaces shown and described herein represent only some of the possibilities. The present method may utilize any user interface to exchange information between a vehicle user and the plug-in electric vehicle and is not limited to any particular type.

Communications module 70 may include any combination of hardware, software and/or other components that enable wireless voice and/or data communication between the vehicle and some other entity. According to one exemplary embodiment, communications module 70 includes a voice interface, a data interface and a GPS receiver 76, and may be bundled or integrated within a device such as a telematics unit. The voice interface enables voice communication to and/or from the plug-in electric vehicle and may include a cellular chipset (e.g., CDMA or GSM chipset), a vocoder, voice over IP (VOIP) equipment, and/or any other suitable device. The data interface, on the other hand, enables data communication to and/or from the plug-in electric vehicle and may include a modem (e.g., a modem using EVDO, CDMA, GPRS or EDGE technologies), a wireless networking component (e.g., one using an IEEE 802.11 protocol, WiMAX, BlueTooth, etc.), or any other suitable device. Depending on the particular embodiment, communications module 70 may communicate over a wireless carrier system (e.g., a cellular network), a wireless network (e.g., a wireless LAN, WAN, etc.), or some other wireless medium. GPS receiver 76 may receive signals from a constellation of GPS satellites and use these signals to determine vehicle position, as is well understood in the art.

The present method may use communications module 70 to exchange information between plug-in electric vehicle 10 and a vehicle user (e.g., via a call center, a website, an "app," a mobile communications device, etc.), a public utility and/or some other entity in a way that facilitates the charging process. For example, communications module 70 may be used to receive electricity rates from a local public utility, to receive electricity rate preferences from a user, etc. This includes remote vehicle users who enter customized charging settings or criteria via a website or mobile device and then send it to the plug-in electric vehicle. In one embodiment, communications module 70 acts as an alternative to user interface 60 for exchanging information between a vehicle user and the plug-in electric vehicle. In another embodiment, communications module 70 and user interface 60 are both used to exchange such information. Other embodiments and arrangements are also possible. The method described below is not limited to any particular communications module or technology, and it may be used with devices other than the exemplary communications module shown and described here.

Again, the preceding description of exemplary plug-in electric vehicle 10 and the drawing in FIG. 1 are only intended to illustrate one potential vehicle arrangement and to do so in a general way. Any number of other vehicle arrangements and architectures, including those that differ significantly from the one shown in FIG. 1, may be used instead.

Figure 2:
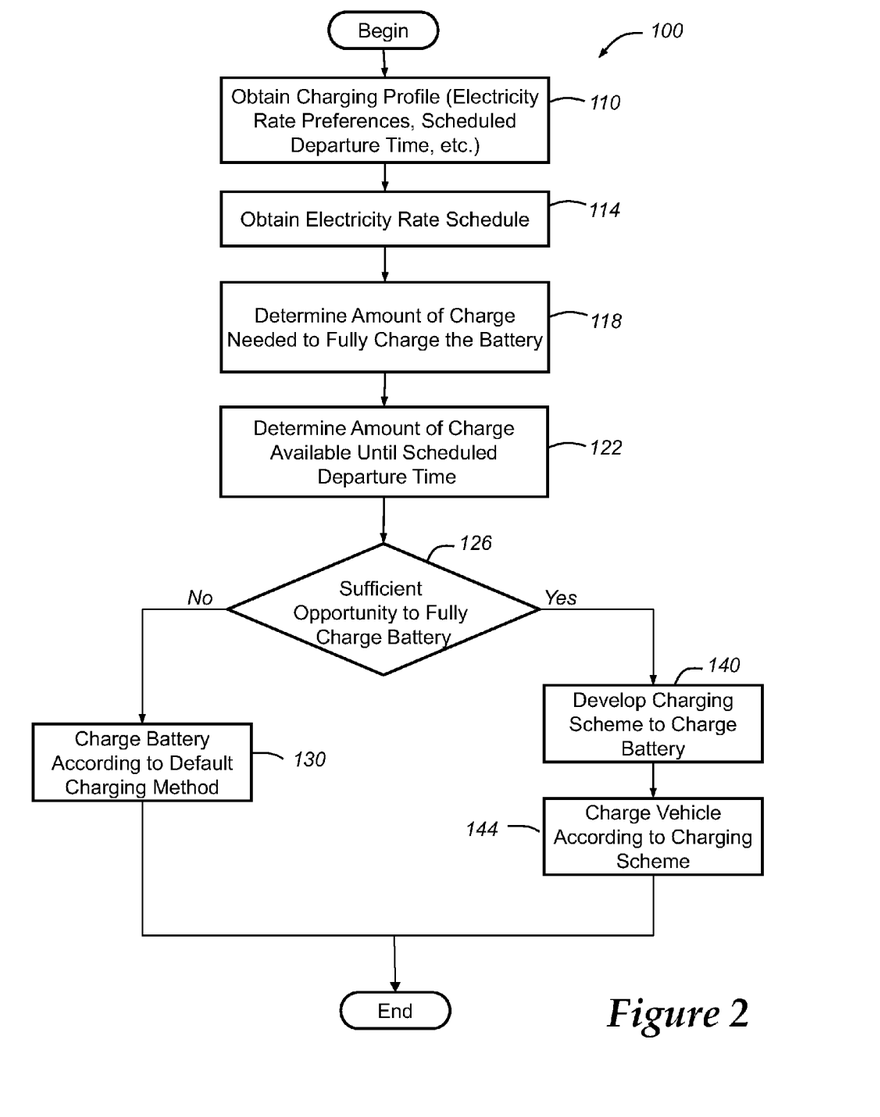
FIG. 2 is a flow chart of an exemplary method for charging a battery for a plug-in electric vehicle, such as that illustrated in FIG. 1.

Turning to FIG. 2, there is shown an exemplary method 100 for charging a battery of a plug-in electric vehicle, such as battery 30. Method 100 may use various readings, conditions, parameters, settings, thresholds, information, comparisons, calculations, etc. to develop a charging scheme that balances both battery life and electricity or charging costs. It should be appreciated that the particular sequence of steps in the following description is just one exemplary embodiment of the charging method and that other sequences of steps, including those with more steps, less steps and/or a different combination or sequence of steps may be used instead.

Starting with step 110, the method obtains a charging profile established by the user. The charging profile may include various pieces of information that have been entered or otherwise provided by the user and that relate to charging the battery. Some non-limiting examples of information that may be included in the charging profile include: electricity rate preferences and scheduled departure times. In one embodiment, the user selects one of the following electricity rate preferences via the user interface 60 and the selection is maintained in the charging profile: low rates (i.e., off peak rates only), low or medium rates (i.e., off peak or partial peak rates only), or low, medium or high rates (i.e., off peak, partial peak or peak rates—anytime charging). If the user selects the 'low rates', then the present method will be more limited as to when it can charge the vehicle, as the user has placed a high priority on lowering the electricity costs. Conversely, if the user choses the 'low, medium or high' rates selection, then the method has more freedom when establishing a charging scheme, but the electricity or charging costs may increase. It should be appreciated that the electricity rate preferences are not limited to the three qualitative settings identified above; it is possible to provide more or less settings for the user to choose from, or to provide quantitative electricity rate preferences that have definitive or quantitative rate limits.

As mentioned above, the method may also obtain the scheduled departure time in step 110. The scheduled departure time may be entered each night by the user or it may be part of a larger charging schedule where each day has its own pre-established departure time. As with the electricity rate preferences, the scheduled departure time may be provided by the user through the user interface 60 and stored in the control module 40 as part of the charging profile. In a different embodiment, the scheduled departure time is automatically determined, as opposed to being entered by the user, by evaluating the past behavior of the user and attempting to discern patterns as to when the user departs or uses the vehicle. Other possibilities certainly exist in terms of electricity rate preferences, scheduled departure times and/or other pieces of information that may be included within the charging profile.

Next, step 114 obtains an electricity rate schedule. Skilled artisans will appreciate that there are many methods and techniques for obtaining utility rate schedules, any one of which may be utilized here. According to one embodiment, communications module 70 or some other device on the plug-in electric vehicle gathers the electricity rate schedule from the electric utility (e.g., by downloading the rate schedule from a website or other source of information affiliated with the electric utility). In a different embodiment, the vehicle may already be in possession of the current electricity rate schedule so that the method can simply retrieve it from memory, such as the memory that is part of control module 40. The present method is not limited to any particular technique for retrieving the electricity rate schedule, so long as the information contained therein is made available.

In step 118, the method determines the amount of charge that is needed to fully charge the battery. According to one embodiment, step 118 uses the current state-of-charge (SOC) level of the battery 30 and the full SOC level of the battery to determine how much charge or energy is needed to fully charge the battery. Consider the example where the battery 30 has a current SOC level of 42% and the full SOC level for that particular battery is 75%; thus, the battery needs a 33% SOC increase in order to become fully charged. It should be appreciated that step 118 may quantify or calculate the amount of charge needed in a variety of ways using a variety of units. For instance, the method may determine the amount of charge needed for full charge in terms of Amp-hours or it may simply determine the amount of time that is needed at expected charging levels. According to the examples provided herein, step 118 determines the amount of charge that is needed to fully charge the battery by determining the current SOC level, determining a full SOC level, and then calculating the amount of time that is needed at expected charging levels (e.g., the number of minutes of charging at expected voltage and current levels provided by external power source 12) to bring the current SOC level to the full SOC level. It should be appreciated that other battery parameters, such as battery voltage and/or current levels, may be used by the present method in lieu of or in combination with the SOC levels described above to determine how much charge is needed to fully charge the battery.

Step 122 then determines the amount of charge available for charging the battery from the present time until the schedule departure time. By knowing the amount of charge that is needed to fully charge the battery (previous step) and the amount of charge that is available between the current time and the scheduled departure time (present step), the method will be able to determine if there is sufficient opportunity to perform the present charging method and fully charge the battery (subsequent step). Again, step 122 is not limited to any particular units, as the determinations and calculations performed therein could be carried out in terms of Amp-hours, in terms of time (e.g., minutes, hours, etc.), or in terms of some other units.

At step 126, the method determines if there is sufficient opportunity to fully charge the battery in the available amount of time. This may be carried out in a number of different ways. For example, if the preceding steps have calculated the amount of charge needed and the amount of charge available in terms of time, then step 126 may compare the number of minutes of expected charging needed for a full charge with the number of minutes available until the scheduled departure time to determine if there is sufficient time to fully charge the battery 30. If there is insufficient time to carry out this process, then the method may proceed to step 130 and charge the battery according to some default charging method that is designed to address this set of circumstances; if there is sufficient time to fully charge the battery, then the method may proceed to step 140. Consider the following example: 12 hours of charging is needed (e.g., correlates to 33% SOC increase at expected voltage and current levels), the current time is 5:00 pm on Thursday, and the scheduled departure time is 9:00 am on Friday. In this scenario, there is ample time to fully charge the battery, thus, the method would progress to step 140 to begin the process of establishing a charging scheme. If, however, the current time is 11:00 pm on Thursday and the scheduled departure time is still 9:00 am, then there would be insufficient time to fully charge the battery, in which case the method would proceed to step 130 for a default charging process.

Figure 3A:
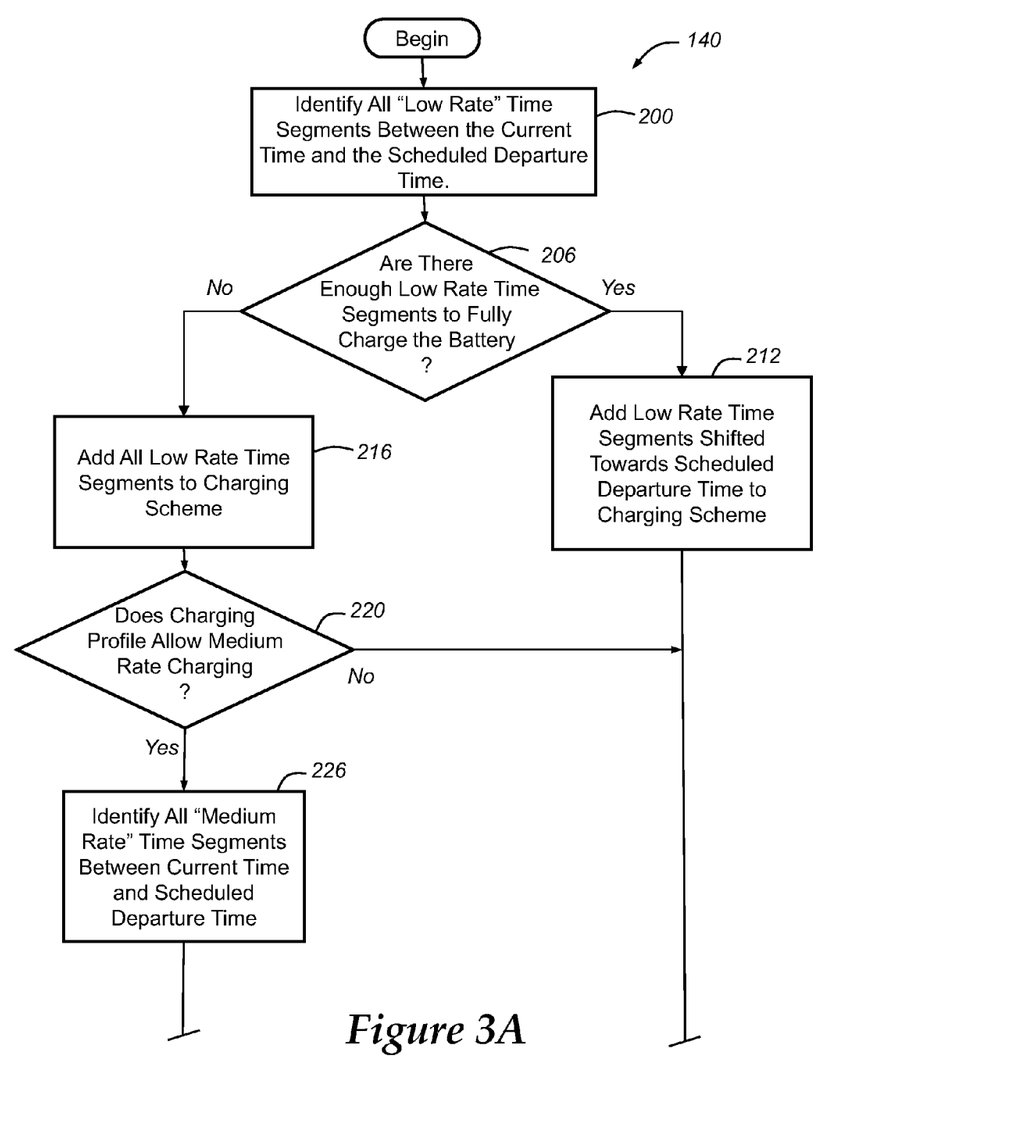
FIGS. 3A-B are flow charts of an exemplary step for developing a charging scheme for charging a battery and may be part of the method shown in FIG. 2.
Figure 3B:
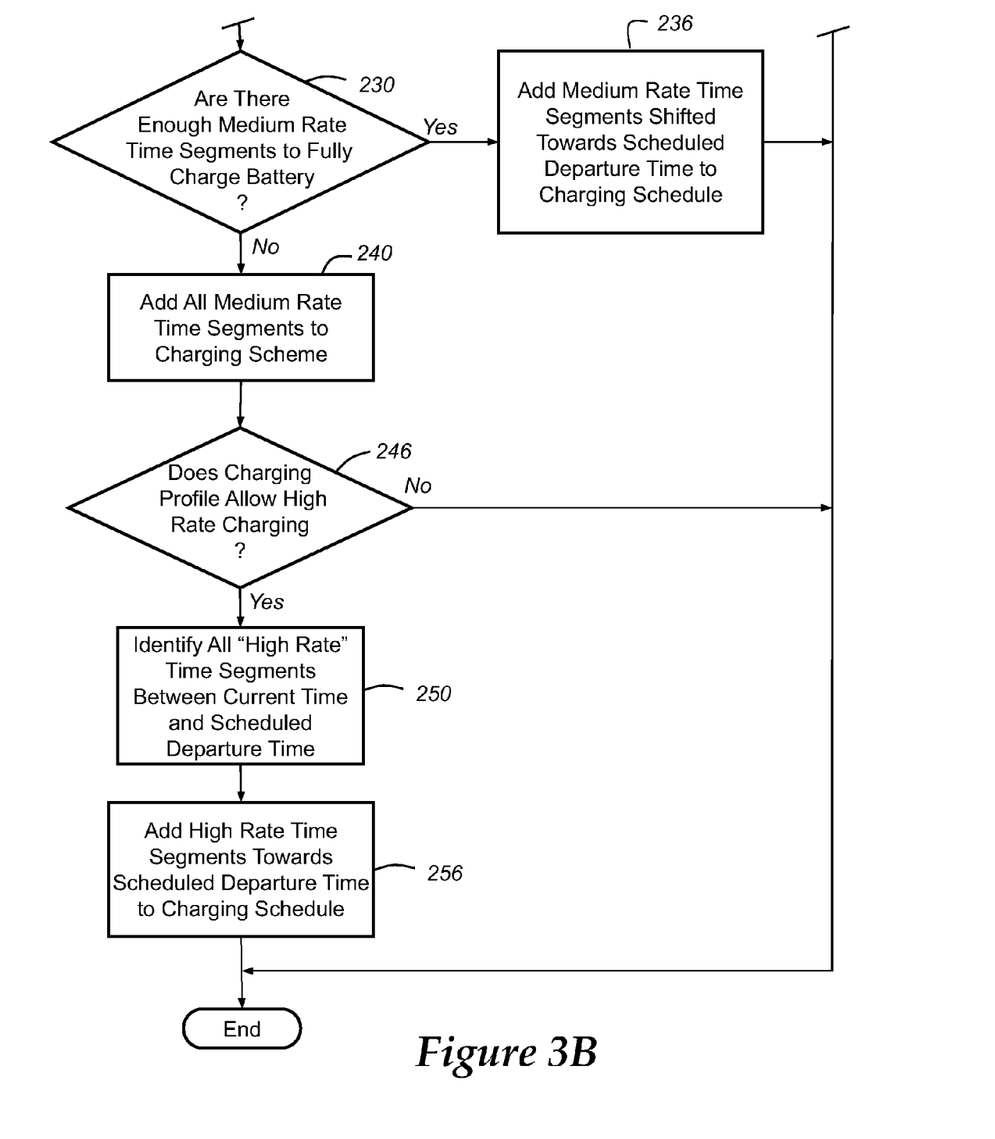
Figure 4:
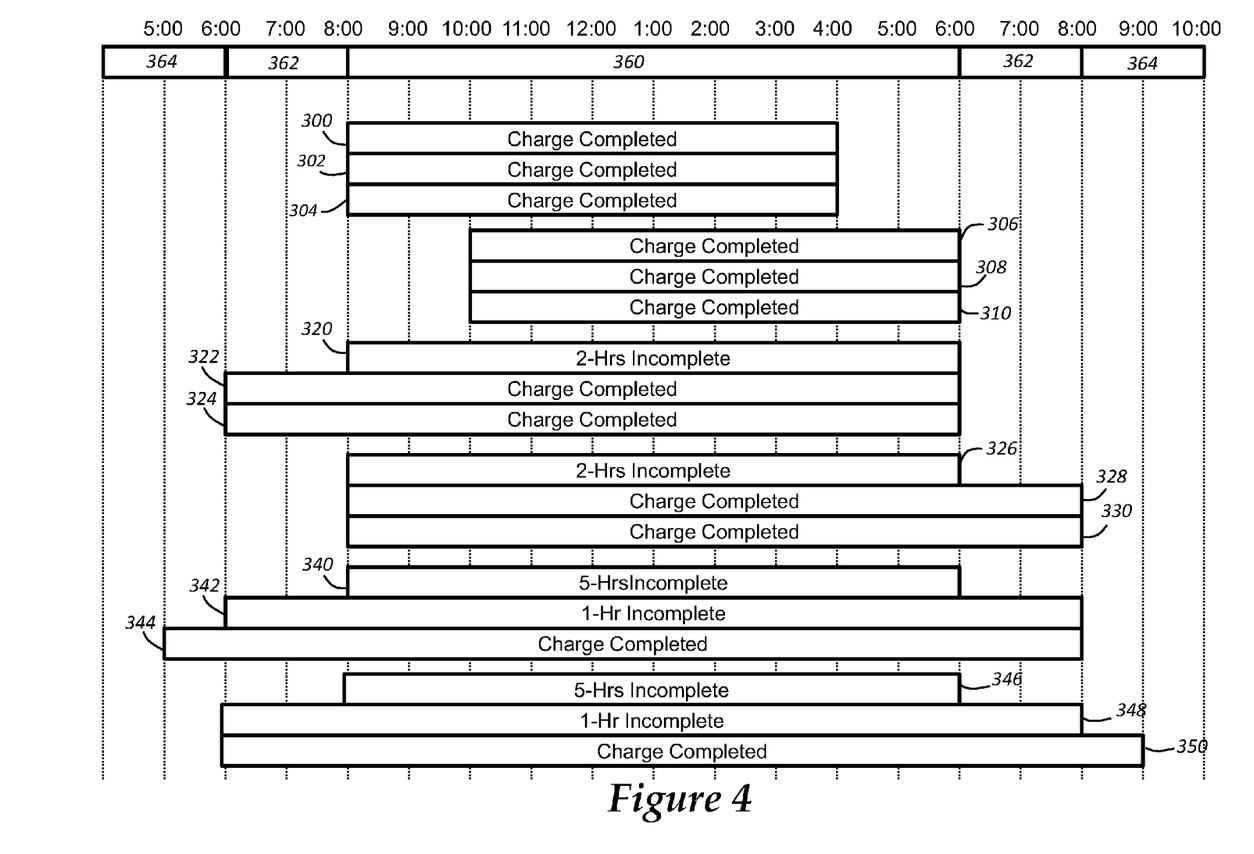
FIG. 4 is a diagram illustrating the exemplary step depicted in FIGS. 3A-B.

Step 140, which is described in conjunction with FIGS. 3A-4, develops or assembles a charging scheme that takes into account both battery life and electricity costs, and does so in a way that is mindful of the user's scheduled departure time and electricity rate preferences. It should be appreciated that the following discussion is merely an exemplary illustration of one possible way of implementing the present method, as others are certainly possible. In step 140, the method divides or organizes the time between the current time and the scheduled departure time into time segments or buckets and then assigns them according to the process described herein. Turning now to FIGS. 3A and 4, step 140 is described in more detail.

Consider the timing chart of FIG. 4, where the current time (e.g., the time the vehicle 10 is plugged into external source 12) is 5:00 pm on Monday and the scheduled departure time is 9:00 am on Tuesday the following morning, and a first set of exemplary charging schemes 300-310 represent instances where the plug-in electric vehicle requires eight hours of charging, a second set of charging schemes 320-330 represent different instances where the vehicle requires twelve hours of charging, and a third set of charging schemes 340-350 are representative of when the vehicle is in need of fifteen hours of charging in order to become fully charged. Charging schemes 300-304, 320-324 and 340-344 represent schemes or charging schedules that are developed without the assistance of the present method (i.e., they are not representative of the present charging method), while charging schemes 306-310, 326-330 and 346-350 are created using the method described herein. Within each block or grouping of three charging schemes (e.g., group 300-304, group 306-310, group 320-324 and so on), the top scheme (300, 306, 320, etc.) represents a scenario where the user has selected only low rate charging in the charging profile, the middle scheme (302, 308, 322, etc.) is representative of low rate or medium rate selections, and the bottom scheme (304, 310, 324, etc.) represents instances where the user has selected low, medium or high rate charging (i.e., anytime charging). As mentioned above, the present method is not limited to the examples provided herein, as the method could easily be used in scenarios where the time segments where divided or classified according to some way other than three qualitative categories (low, medium high rate time segments); such possibilities include more or less than three categories, as well as other qualitative or even quantitative categories, to cite a few examples.

Starting with step 200, the method identifies all of the 'low rate' time segments between the current time and the scheduled departure time. In terms of the example shown in the timing chart of FIG. 4, the ten time segments 360 (from 8:00 pm-6:00 am) represent low rate or first category time segments. In the past, charging schemes might have been developed by filling in the first available time segments for a particular electricity rate category—in the case of previous charging schemes 300-304, the time segments starting at 8:00 pm would have been filled in first. However, this type of charging scheme has the potential drawback of keeping the vehicle battery fully charged at a high SOC level for a longer period of time, which can degrade the long term health or life of the battery. This is why charging schemes 306-310, which are developed according to the present method, are shifted towards the scheduled departure time so that the battery is at a high SOC level for a shorter duration before the next time the user drives the vehicle. This process is now described.

Step 206 determines if there are enough low rate time segments to fully charge the battery. For example, step 206 could compare the amount of charge needed to fully charge the battery (previously determined in step 118) with the ten low rate time segments 360. In the case of charging schemes 300-310, the vehicle needs eight hours of charging and there are ten hours of low rate charging available. Thus, step 206 determines that there are enough low rate time segments to fully charge the battery and the method progresses to step 212 so that the charging scheme can be filled with all low rate time segments. As shown in FIG. 4, the three charging schemes 306-310 are all shifted within the low rate time segments 360 so that they are closer to the scheduled departure time than charging schemes 300-304 which are not similarly shifted. Put differently, the charging schemes 306-310 are comprised of a portion of the overall available low rate time segments; the portion of low rate time segments that are temporally located closest to the scheduled departure time. Each of the charging schemes 306-310 is exclusively comprised of low rate time segments (thus, satisfies all of the user selected electricity rate preferences) and completes charging at 6:00 am, which is the closest available time segment to the scheduled departure time that is still a low rate segment; this is what is meant by "shifting" within a certain time rate category towards the scheduled departure time. This balanced approach is mindful of both electricity costs and battery life. If step 206 determines that there are not enough low rate time segments to fully charge the battery (a scenario represented by charging schemes 320-330), then the method proceeds to step 216.

In step 216, the method adds all of the low rate time segments 360 to the charging scheme, but additional charging time is needed to bring the battery to a full charge. In the present example, the low rate time segments have the least expensive electricity costs, thus, it is assumed that these segments will automatically satisfy all user selected or defined electricity rate preferences. The same is not necessarily true with the medium rate or second category time segments 362 (6:00 pm-8:00 pm and 4:00 am-6:00 am), which is why step 220 determines if the user-selected charging profile allows for medium rate charging. As mentioned above, charging schemes 320-330 are examples of when twelve hours of charging is needed to fully charge the battery, where schemes 320-324 are not developed with the present method and schemes 326-330 are developed with the present method. If step 220 determines that medium rate charging is not allowed, then the charging scheme would only include the low rate time segments previously assigned and step 140 would end. This scenario is represented by charging scheme 326, which only includes low rate charging but leaves the vehicle two hours short of being fully charged. If step 220 concludes that medium rate charging is allowed, then the method proceeds to step 226.

Step 226 identifies all medium rate time segments 362 between the current time and the scheduled departure time, and step 230 determines if there are enough medium rate time segments to complete the charging process. If there are enough medium rate time segments or slots to fully charge the battery, then step 236 adds those medium rate time segments closest to the scheduled departure time to the charging scheme, which already includes all of the low rate time segments 360. With reference to FIG. 4, charging scheme 328 fills ten of the twelve needed hours of charging with low rate time segments 360, but still needs two additional hours of charging to fully charge the vehicle. Selecting the medium rate time slots from 6:00 am-8:00 am is different than the approach taken by charging scheme 322 which uses the first available medium rate time segments between 6:00 pm-8:00 pm the previous day. Those skilled in the art will appreciate that the alternative charging scheme 322 finishes charging at 6:00 am, where the present charging scheme 328 finishes at 8:00 am—two hours closer to the scheduled departure time. If there are not enough medium rate time slots to finish the charging process, then the method proceeds to step 240.

At step 240, the method adds all of the medium rate time segments 362 to the charging scheme so that the scheme includes all low and medium rate segments 360 and 362.

This scenario, where the amount of time needed to fully charge the battery is greater than the low and medium rate time segments together, is represented by charging schemes 340-350. It should be appreciated that at this point, the method has already added or included time segments 360 and 362 which total fourteen hours of charging, but in order to be fully charged an additional one hour of charging is needed. Step 246 then consults the charging profile and determines if high rate charging is allowed (in exemplary charging schemes 346-350, only scheme 350 allows for high rate charging). If step 246 determines that high rate charging is not allowed, then the charging scheme is complete (even though it is one hour short) and step 140 ends; if step 246 determines that high rate charging is allowed, then the method proceeds to step 250.

Step 250 identifies all high rate time segments 364 between the current time and the scheduled departure time, and step 256 adds those high rate time segments located nearest the scheduled departure time to the charging scheme. It is possible for the present method to include an optional step to determine if there are enough high rate time segments to complete the charging process, but this may be unnecessary in the current embodiment because step 206 already determined that there are enough available time segment to fully charge the battery and the high rate segments 364 are the last group of time segments to be considered. As illustrated in FIG. 4, charging scheme 350 adds the high rate or third category time segment 364 located nearest the scheduled departure time (8:00 am-9:00 am) to the charging scheme, as opposed to charging scheme 344 which adds the high rate segment at the beginning of the timing chart (5:00 pm-6:00 pm the previous day). The result is that the present method develops a charging scheme 350 that finishes charging right at the scheduled departure time of 9:00 am, whereas the alternative scheme 344 finishes at 8:00 am. Again, it is an objective of exemplary method 100 to provide a balanced approach to charging that addresses both electricity costs and overall battery life.

In each of the examples shown in FIG. 4, comparable charging schemes (i.e., schemes with the same electricity rate preference constraints and the same charging requirements like schemes 300 and 306, schemes 302 and 308, schemes 304 and 310 and so on) end up having the same overall charging costs but those developed according to the present method improve the overall life or health of the battery by shifting charging towards the scheduled departure time. Take schemes 304 and 310, for example, they both result in eight hours of charging at the low rate level, but charging scheme 310 finishes two hours closer to the scheduled departure time than does charging scheme 304. Similarly, charging schemes 322 and 328 both charge the battery for ten hours at the low rate setting and two additional hours at the medium rate, but scheme 328 finishes two hours closer to the scheduled departure time. Schemes 344 and 350 also end up having the same general charging costs (ten hours at the low rate, four hours at the medium rate, and one hour at the high rate), but charging scheme 350 completes the charging process at the scheduled departure time, which is one hour after scheme 344. The preceding examples are just meant to illustrate some of the features of the present method and are not intended to limit the method.

Returning to FIG. 2, the method 100 proceeds to step 144 where the vehicle or battery is charged according to the charging scheme just developed. It is possible for other features, considerations, etc. to be taken into account when developing and/or implementing the charging scheme discussed herein. Any combination of such features may be employed or used with the method just described. At this point, method 100 may end or it may progress to carry out other suitable steps.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, one or more of the steps in method 100 may not be performed or may not be applicable, or may be performed in a different sequence than that or those described above. The order of steps 102, 110 and/or 120 could be changed or, for example, some of those steps could be omitted. Therefore, it will be appreciated that embodiments of method 100 comprising less than all of the steps described above, and/or different sequences of the steps thereof, remain within the spirit and scope of the present disclosure. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of charging a battery in a plug-in electric vehicle, comprising the steps of:
    obtaining electricity rate preferences;
    obtaining a scheduled departure time;
    determining an amount of charging needed to fully charge the battery; and
    developing a charging scheme with a control module and charging the battery with a battery charger according to the developed charging scheme, wherein the charging scheme satisfies the electricity rate preferences and shifts charging towards the scheduled departure time so as to reduce an amount of time at which the battery is maintained at an elevated charge before the scheduled departure time.

2. The method of claim 1, wherein the steps of obtaining electricity rate preferences and obtaining a scheduled departure time further comprise obtaining electricity rate preferences and obtaining a scheduled departure time from a user selected charging profile.

3. The method of claim 1, wherein the step of determining an amount of charging needed to fully charge the battery further comprises: determining a current SOC level for the battery, determining a full SOC level for the battery, and calculating an amount of charging needed to fully charge the battery so that the current SOC level is brought to the full SOC level.

4. The method of claim 3, wherein the amount of charging needed is calculated in terms of Amp-hours.

5. The method of claim 3, wherein the amount of charging needed is calculated in terms of time at expected charging levels.

6. The method of claim 3, wherein the step of determining an amount of charging needed to fully charge the battery further comprises: determining an amount of time available until the scheduled departure time, comparing an amount of time needed to fully charge the battery with the amount of time available until the scheduled departure time, and determining if there is sufficient time to fully charge the battery by the scheduled departure time.

7. A method of charging a battery in a plug-in electric vehicle, comprising the steps of:
obtaining electricity rate preferences;
obtaining a scheduled departure time;
determining an amount of charging needed to fully charge the battery; and
developing a charging scheme with a control module and charging the battery with a battery charger according to the developed charging scheme, the charging scheme satisfies the electricity rate preferences and shifts charging towards the scheduled departure time, wherein the step of developing a charging scheme further comprises: identifying one or more first category time segments between a current time and the scheduled departure time, determining if there are enough first category time segments to fully charge the battery, and when there are enough first category time segments to fully charge the battery then adding a portion of the first category time segments that are closest to the scheduled departure time to the charging scheme so that charging is shifted within the first category time segments towards the scheduled departure time.

8. The method of claim 7, wherein the first category time segments correspond with low rate time segments.

9. The method of claim 7, when there are not enough first category time segments to fully charge the battery then the step of developing a charging scheme further comprises: identifying one or more second category time segments between the current time and the scheduled departure time, determining if the second category time segments satisfy the electricity rate preferences, determining if there are enough first and second category time segments combined to fully charge the battery, and when the second category time segments satisfy the electricity rate preferences and there are enough first and second category time segments combined to fully charge the battery then adding a portion of the second category time segments that are closest to the scheduled departure time to the charging scheme so that charging is shifted within the second category time segments towards the scheduled departure time.

10. The method of claim 9, wherein the first category time segments correspond with low rate time segments and the second category time segments correspond to medium rate time segments with higher electricity costs than the low rate time segments.

11. The method of claim 9, when the second category time segments do not satisfy the electricity rate preferences then developing a charging scheme that only includes first category time segments but does not fully charge the battery.

12. The method of claim 9, when there are not enough first and second category time segments to fully charge the battery then the step of developing a charging scheme further comprises: identifying one or more third category time segments between the current time and the scheduled departure time, determining if the third category time segments satisfy the electricity rate preferences, determining if there are enough first, second and third category time segments combined to fully charge the battery, and when the third category time segments satisfy the electricity rate preferences and there are enough first, second and third category time segments combined to fully charge the battery then adding a portion of the third category time segments that are closest to the scheduled departure time to the charging scheme so that charging is shifted within the third category time segments towards the scheduled departure time.

13. The method of claim 12, wherein the first category time segments correspond with low rate time segments, the second category time segments correspond to medium rate time segments with higher electricity costs than the low rate time segments, and the third category time segments correspond to high rate time segments with higher electricity costs than the medium rate time segments.

14. The method of claim 12, when the third category time segments do not satisfy the electricity rate preferences then developing a charging scheme that only includes first and second category time segments but does not fully charge the battery.

15. The method of claim 1, further comprising the step of:
obtaining an electricity rate schedule from a power provider and using the electricity rate schedule when determining if the charging scheme satisfies the electricity rate preferences.

16. A method of charging a battery in a plug-in electric vehicle, comprising the steps of:
obtaining an electricity rate schedule;
obtaining electricity rate preferences;
obtaining a scheduled departure time;
identifying a plurality of time segments between a current time and the scheduled departure time that satisfy the electricity rate preferences according to the electricity rate schedule; and
developing a charging scheme with a control module and charging the battery with a battery charger according to the developed charging scheme, wherein the charging scheme includes one or more time segments from the plurality of time segments and is designed to complete the charging process as close to the scheduled departure time as possible so as to minimize the amount of time between completion of the charging process and the scheduled departure time.

* * * * *